(12) United States Patent
Ishiyama et al.

(10) Patent No.: US 11,428,307 B2
(45) Date of Patent: *Aug. 30, 2022

(54) HYDRAULICALLY ACTUATED TRANSMISSION

(71) Applicant: Mazda Motor Corporation, Hiroshima (JP)

(72) Inventors: Takashi Ishiyama, Higashihiroshima (JP); Fumitoshi Sato, Nasukarasuyama (JP); Hiroyuki Okayama, Hiroshima (JP); Masuhiro Kawakami, Higashihiroshima (JP); Tomokazu Kinoshita, Hiroshima (JP)

(73) Assignee: Mazda Motor Corporation, Hiroshima (JP)

( * ) Notice: Subject to any disclaimer, the term of this patent is extended or adjusted under 35 U.S.C. 154(b) by 711 days.

This patent is subject to a terminal disclaimer.

(21) Appl. No.: 16/347,142

(22) PCT Filed: Nov. 1, 2017

(86) PCT No.: PCT/JP2017/039512
§ 371 (c)(1),
(2) Date: May 2, 2019

(87) PCT Pub. No.: WO2018/088295
PCT Pub. Date: May 17, 2018

(65) Prior Publication Data
US 2020/0056694 A1 Feb. 20, 2020

(30) Foreign Application Priority Data
Nov. 9, 2016 (JP) .............................. JP2016-218850

(51) Int. Cl.
*F16H 57/04* (2010.01)
*F16H 59/72* (2006.01)
*F16H 61/00* (2006.01)

(52) U.S. Cl.
CPC ..... *F16H 57/0413* (2013.01); *F16H 57/0435* (2013.01); *F16H 57/0446* (2013.01);
(Continued)

(58) Field of Classification Search
CPC ............. F16H 57/0413; F16H 57/0435; F16H 57/0471; F16H 57/0446; F16H 56/72; F16H 61/0021; F16H 2061/0037
See application file for complete search history.

(56) References Cited

U.S. PATENT DOCUMENTS 3,220,392 A    11/1965   Cummins
6,044,645 A *   4/2000   Greenan ............. F16H 57/0412
                                                                                     60/339
(Continued)

FOREIGN PATENT DOCUMENTS

CN    101446346 A    6/2009
CN    101761642 A    6/2010
(Continued)

OTHER PUBLICATIONS

European Patent Office, Extended European Search Report Issued in Application No. 17870492.0, dated Oct. 2, 2019, Germany, 9 pages.

*Primary Examiner* — Daniel D Yabut
(74) *Attorney, Agent, or Firm* — Alleman Hall Creasman & Tuttle LLP

(57) ABSTRACT

A hydraulically actuated transmission includes a reducing valve provided at a lubricant oil supplying circuit and configured to reduce a pressure of a lubricant oil having a predetermined pressure and output the lubricant oil with a reduced pressure; and a switching device (switching valve) configured to selectively switch between a first path and a second path as the path for supplying the lubricant oil from the reducing valve to a to-be-lubricated portion. The reducing valve is configured such that an output pressure of the lubricant oil from the reducing valve is higher when the
(Continued)

second path is selected by the switching device, than when the first path is selected by the switching device.

6 Claims, 4 Drawing Sheets

(52) U.S. Cl.
CPC .......... *F16H 59/72* (2013.01); *F16H 61/0021* (2013.01); *F16H 2061/0037* (2013.01)

(56) References Cited

U.S. PATENT DOCUMENTS

| | | | |
|---|---|---|---|
| 6,199,441 | B1 | 3/2001 | Kanenobu et al. |
| 11,047,468 | B2* | 6/2021 | Ishiyama ............ F16H 57/0446 |
| 2002/0128107 | A1 | 9/2002 | Wakayama |
| 2004/0204281 | A1* | 10/2004 | Wakayama ......... F16H 57/0412 |
| | | | 475/159 |
| 2008/0234903 | A1 | 9/2008 | Satou |
| 2009/0139815 | A1 | 6/2009 | Frait et al. |
| 2010/0151981 | A1 | 6/2010 | Hartinger et al. |
| 2011/0125360 | A1 | 5/2011 | Kariya et al. |
| 2012/0211326 | A1 | 8/2012 | Li et al. |
| 2012/0247106 | A1 | 10/2012 | Noda et al. |
| 2012/0247911 | A1 | 10/2012 | Noda et al. |
| 2012/0252631 | A1 | 10/2012 | Saji et al. |
| 2013/0112030 | A1 | 5/2013 | Feldt et al. |
| 2014/0245731 | A1 | 9/2014 | Kutsubo et al. |
| 2014/0291101 | A1 | 10/2014 | Schuller et al. |
| 2015/0000441 | A1 | 1/2015 | Brushkivskyy et al. |
| 2016/0109019 | A1 | 4/2016 | Saji et al. |
| 2018/0080366 | A1 | 3/2018 | Toyama et al. |
| 2019/0271388 | A1 | 9/2019 | Ishiyama et al. |

FOREIGN PATENT DOCUMENTS

| | | |
|---|---|---|
| CN | 101994825 A | 3/2011 |
| CN | 103562598 A | 2/2014 |
| DE | 102013001928 A1 | 8/2014 |
| JP | 2002181173 A | 6/2002 |
| JP | 2004156680 A | 6/2004 |
| JP | 2008215434 A | 9/2008 |
| JP | 2009127719 A | 6/2009 |
| JP | 2011106345 A | 6/2011 |
| JP | 2011106656 A | 6/2011 |
| JP | 2012215246 A | 11/2012 |
| JP | 2014234879 A | 12/2014 |
| JP | 2015218869 A | 12/2015 |
| JP | 2016061340 A | 4/2016 |
| WO | 2016159008 A | 10/2016 |

* cited by examiner

|  | FIRST GEAR | SECOND GEAR | THIRD GEAR | FOURTH GEAR | FIFTH GEAR | SIXTH GEAR | SEVENTH GEAR | EIGHTH GEAR | REVERSE GEAR |
|---|---|---|---|---|---|---|---|---|---|
| CL1 | ○ |  | ○ |  | ○ | ○ | ○ |  |  |
| CL2 |  | ○ | ○ | ○ |  | ○ |  | ○ |  |
| CL3 |  |  |  | ○ | ○ | ○ | ○ | ○ | ○ |
| BR1 | ○ | ○ |  |  |  |  | ○ | ○ | ○ |
| BR2 | ○ | ○ | ○ | ○ | ○ |  |  |  | ○ |

HYDRAULICALLY ACTUATED TRANSMISSION

TECHNICAL FIELD

The present invention relates to a hydraulically actuated transmission that is installed in a vehicle.

BACKGROUND ART

A lubricant oil supplying circuit for supplying lubricant oil to a to-be-lubricated portion in a hydraulically actuated transmission is generally provided with a heat exchanger to adjust the temperature of the lubricant oil. Examples of such a heat exchanger include an oil warmer (also referred to as a water-cooled oil cooler) in which heat is exchanged between engine-cooling water and the lubricant oil, and an oil cooler (air-cooled oil cooler) in which heat is exchanged between drive airflow generated by a running vehicle and the lubricant oil.

Patent Document 1 discloses providing a bypass channel for bypassing an oil warmer, and providing the bypass channel with a bypass valve for opening and closing the bypass channel, and a control valve. The control valve is controlled such that when the temperature of the lubricant oil is low, an amount of the lubricant oil to be drained from a drain port of the control valve to an oil pan is equal to or more than an amount to be drained when the temperature of the lubricant oil is high. It is therefore possible to reduce a dragging loss in the to-be-lubricated portion when the lubricant oil temperature is low.

CITATION LIST

Patent Document

Patent Document 1: Japanese Unexamined Patent Publication No. 2016-061340

SUMMARY OF THE INVENTION

Technical Problem

It is conceivable to provide both of an oil warmer and an oil cooler in the lubricant oil supplying circuit. In such a configuration, for example, the lubricant oil is supplied to the to-be-lubricated portion via the oil warmer and the oil cooler when the lubricant oil temperature is low, whereas the lubricant oil is supplied to the to-be-lubricated portion via the oil cooler, while bypassing the oil warmer, when the lubricant oil temperature is high. In this manner, the lubricant oil can be warmed by the oil warmer when the lubricant oil temperature is low, and can be cooled by the oil cooler when the lubricant oil temperature is high. The to-be-lubricated portion can thus be cooled and lubricated properly. Alternatively, supply paths of the lubricant oil leading to the to-be-lubricated portion can be changed so as to pass through the oil warmer and/or the oil cooler as described above, according to the magnitude of the load applied to the hydraulically actuated transmission.

In such a structure as described above, in general, the amount of lubricant oil to be supplied to the to-be-lubricated portion is substantially the same regardless of whether the lubricant oil temperature (or the load of the hydraulically actuated transmission) is low or high. When the lubricant oil temperature (the load) is high, the supply amount of the lubricant oil is somewhat increased, compared to when the lubricant oil temperature (the load) is low, because the flow resistance in the oil warmer is eliminated. However, such an increase in the supply amount of the lubricant oil is not very significant.

In general, when the lubricant oil temperature (the load) is high, it is often required to cool and lubricate rotating members or the like. It is therefore necessary to increase the supply amount of the lubricant oil to the to-be-lubricated portion in order to ensure reliability. However, because the supply amount of the lubricant oil does not change significantly depending on whether the lubricant oil temperature (the load) is high or low, it is difficult to supply a larger amount of the lubricant oil to the to-be-lubricated portion, when the lubricant oil temperature (the load) is high.

It is also conceivable, like the control valve disclosed in Patent Document 1, to cause the supply amount of the lubricant oil to the to-be-lubricated portion to differ between the cases in which the temperature of the lubricant oil (the load) is high and the temperature of the lubricant oil (the load) is low, by increasing a drained amount of the lubricant oil drained from the drain port to the oil pan when the lubricant oil temperature (the load) is low. However, such a configuration merely achieves a situation in which a smaller amount of the lubricant oil is drained when the lubricant oil temperature (the load) is high, compared to when the lubricant oil temperature (the load) is low, thereby providing a limited effect in ensuring a larger amount of lubricant oil when the lubricant oil temperature (the load) is high.

In view of the foregoing, it is an object of the present invention directed to a hydraulically actuated transmission, in which a path for supplying a lubricant oil to a to-be-lubricated portion is switched between a first path passing through an oil warmer and an oil cooler and a second path bypassing the oil warmer and passing through the oil cooler, to supply an appropriate amount of the lubricant oil to the to-be-lubricated portion in accordance with the switching of the path.

Solution to the Problem

To achieve the above object, the present invention is directed to a hydraulically actuated transmission installed in a vehicle, the hydraulically actuated transmission including: a lubricant oil supplying circuit configured to supply a lubricant oil to a to-be-lubricated portion in the hydraulically actuated transmission; and a reducing valve provided at the lubricant oil supplying circuit and configured to reduce a pressure of the lubricant oil having a predetermined pressure and output the lubricant oil with a reduced pressure. The lubricant oil supplying circuit includes a first path for supplying the lubricant oil from the reducing valve to the to-be-lubricated portion via an oil warmer and an oil cooler, and a second path for supplying the lubricant oil from the reducing valve to the to-be-lubricated portion via the oil cooler while bypassing the oil warmer. The hydraulically actuated transmission further includes a switching device configured to selectively switch between the first path and the second path as the path for supplying the lubricant oil from the reducing valve to the to-be-lubricated portion. The reducing valve is configured such that an output pressure of the lubricant oil output from the reducing valve is higher when the second path is selected by the switching device, than when the first path is selected by the switching device.

With this structure, the output pressure of the lubricant oil output from the reducing valve is higher when the second path is selected by the switching device, than when the first path is selected by the switching device. Therefore, when the lubricant oil temperature (or the load of the hydraulically actuated transmission) is high, a larger amount of lubricant oil can be supplied to the to-be-lubricated portion, than when the lubricant oil temperature (the load) is low. Moreover, by setting the output pressure of the lubricant oil as high as possible when the lubricant oil temperature (the load) is high, a sufficient amount of lubricant oil can be supplied to the to-be-lubricated portion when the lubricant oil temperature (the load) is high. On the other hand, when the lubricant oil temperature (the load) is low, a smaller amount of lubricant oil can be supplied to the to-be-lubricated portion, so that it is possible to reduce energy loss which occurs due to stirring of the lubricant oil by a rotating member or the like at the to-be-lubricated portion. Therefore, an appropriate amount of lubricant oil can be supplied to the to-be-lubricated portion by the switching of the switching device between the first path and the second path.

According to an embodiment of the hydraulically actuated transmission, the reducing valve includes: a first regulation port to which part of the lubricant oil flowing through the first path upstream of the oil warmer and the oil cooler is input; a second regulation port to which part of the lubricant oil flowing through the second path upstream of the oil cooler is input; a spool pressed toward one end in an axial direction of the spool by the lubricant oil input to the first regulation port or the second regulation port; and a spring pressing the spool toward the other end in the axial direction of the spool. The reducing valve is configured such that a pressing force applied to the spool toward the one end of the spool by the lubricant oil input to the second regulation port is smaller than a pressing force applied to the spool toward the one end of the spool by the lubricant oil input to the first regulation port, and therefore such that the output pressure of the lubricant oil from the reducing valve is higher when the second path is selected by the switching device, than when the first path is selected by the switching device.

With this configuration, the output pressures of the lubricant oil output from the reducing valve can be switched automatically in accordance with the switching of the switching device between the first path and the second path. It is therefore possible to simplify the structure of the reducing valve.

According to another embodiment of the hydraulically actuated transmission, the switching device is configured as a switching valve, and the switching valve includes: an inlet port to which the lubricant oil from the reducing valve is input; a first outlet port connected to the first path; and a second outlet port connected to the second path. The switching valve is capable of selectively switching between a first state and a second state: in the first state, the inlet port communicates with the first outlet port, and the first path is used as the path for supplying the lubricant oil from the reducing valve to the to-be-lubricated portion; and in the second state, the inlet port communicates with the second outlet port, and the second path is used as the path for supplying the lubricant oil from the reducing valve to the to-be-lubricated portion.

Thus, the path for supplying the lubricant oil to the to-be-lubricated portion can be switched between the first path and the second path using a simple structure.

In the case in which the switching device is configured as a switching valve, the hydraulically actuated transmission may further include a solenoid valve configured to switch between supplying and not supplying the hydraulic oil having a preset pressure to a control port provided at the switching valve. The switching valve may be configured to switch between the first state and the second state depending on the supplying or not supplying the hydraulic oil to the control port by the solenoid valve.

With this configuration, the switching valve is operated through the control of the solenoid valve, thereby making it possible to easily switch between the first path and the second path as the path for supplying the lubricant oil to the to-be-lubricated portion can be easily switched between.

Advantages of the Invention

As described above, according to a hydraulically actuated transmission of the present invention, an output pressure of a lubricant oil output from a reducing valve is higher when a second path is selected by a switching device, than when a first path is selected by the switching device, thereby making it possible to supply an appropriate amount of the lubricant oil to a to-be-lubricated portion according to the switching between the first path and the second path by the switching device.

DESCRIPTION OF EMBODIMENTS

An exemplary embodiment will be described in detail below with reference to the drawings.

Figures 1, 2:
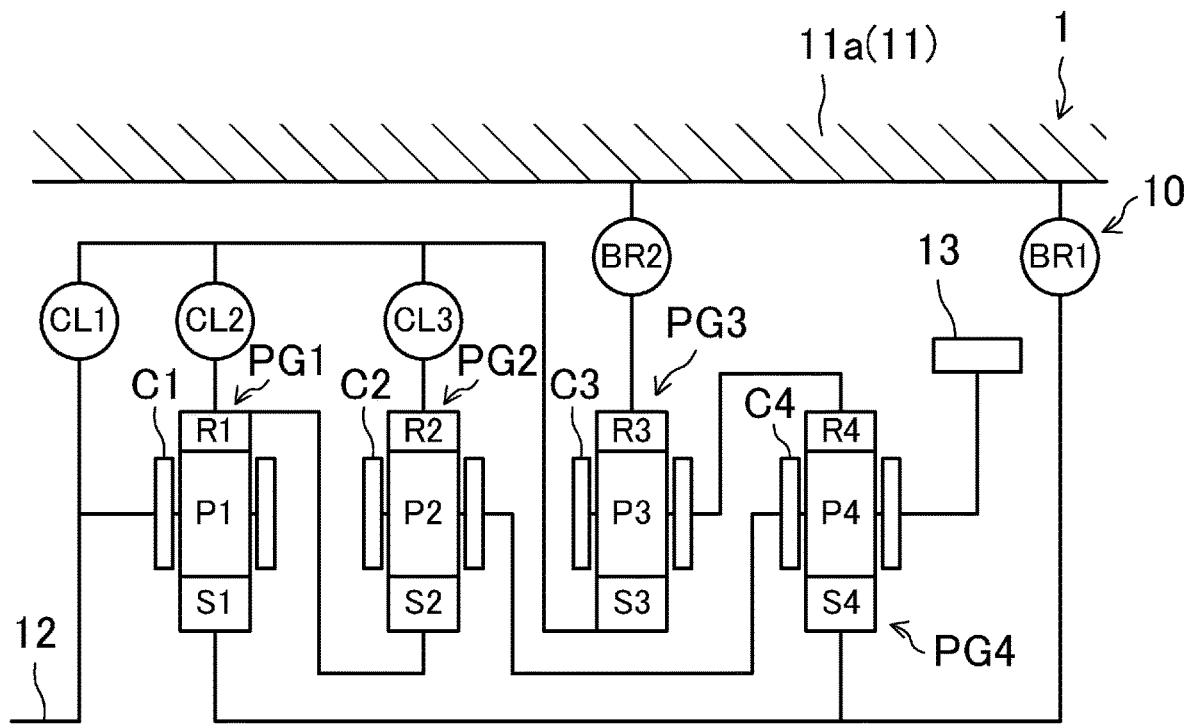
FIG. 1 is a schematic illustrating an outline of a hydraulically actuated transmission according to an exemplary embodiment.
FIG. 2 is a coupling table indicating frictional coupling elements that are coupled in each transmission gear in the hydraulically actuated transmission.

FIG. 1 illustrates a hydraulically actuated transmission 1 (hereinafter, referred to as a transmission 1) according to the exemplary embodiment. The transmission 1 is an automatic transmission installed in a vehicle, and achieving eight forward speeds and one reverse speed. The transmission 1 includes a tubular transmission casing 11, and a transmission mechanism 10 which is installed inside the transmission casing 11, and which receives driving power from a driving source not illustrated. The driving source is an engine in this embodiment, but the driving source may be a motor.

The transmission mechanism 10 includes an input shaft 12 corresponding to an input unit of the transmission 1, and an output gear 13 corresponding to an output unit of the transmission 1. The input shaft 12 is connected directly to the output shaft of the driving source. In other words, in this embodiment, there is no torque converter provided between the output shaft of the driving source and the input shaft 12 of the transmission 1. In this embodiment, the driving source and the transmission 1 are joined to each other, and installed in the vehicle in an orientation in which the output shaft of the driving source and the input shaft 12 extend along the width direction of the vehicle. The output gear 13 is provided at a portion of the transmission casing 11 on the side (the right side in FIG. 1) opposite to the driving source side. The driving power is transmitted to the output gear 13, and input to the input gear of a differential mechanism via a counter-shaft input gear and a counter-shaft output gear that are provided on a counter shaft. The counter shaft extends in parallel with the input shaft 12. The driving power is then transmitted to driving wheels (front wheels) of the vehicle via the differential mechanism.

The transmission mechanism 10 also includes a first planetary gear set PG1 (hereinafter, referred to as a first gear set PG1), a second planetary gear set PG2 (hereinafter, referred to as a second gear set PG2), a third planetary gear set PG3 (hereinafter, referred to as a third gear set PG3), and a fourth planetary gear set PG4 (hereinafter, referred to as a fourth gear set PG4) that are aligned in the axial direction of the input shaft 12 (which is also the axial direction of the transmission 1). The first gear set PG1, second gear set PG2, third gear set PG3, and fourth gear set PG4 are arranged between the input shaft 12 and the output gear 13, in the order listed herein, from the driving source side. These gear sets constitute a plurality of paths in which the driving power is transmitted from the input shaft 12 to the output gear 13. The input shaft 12, the output gear 13, and the first to fourth gear sets PG1 to PG4 are coaxially positioned.

The transmission mechanism 10 also includes five frictional coupling elements (a first clutch CL1, a second clutch CL2, a third clutch CL3, a first brake BR1, and a second brake BR2) for selecting and switching to one of the paths formed by the first to fourth gear sets PG1 to PG4 and transmitting the driving power.

The first gear set PG1 includes a first sun gear S1, a first ring gear R1, and a first carrier C1 as rotating elements. The first gear set PG1 is a single-pinion gear set. A plurality of pinions P1 supported by the first carrier C1 are arranged apart from one another along the circumferential direction of the first gear set PG1, and meshed with both of the first sun gear S1 and the first ring gear R1.

The second gear set PG2 includes a second sun gear S2, a second ring gear R2, and a second carrier C2 as rotating elements. The second gear set PG2 is also a single-pinion gear set. A plurality of pinions P2 supported by the second carrier C2 are arranged apart from each other along the circumferential direction of the second gear set PG2, and meshed with both of the second sun gear S2 and the second ring gear R2.

The third gear set PG3 includes a third sun gear S3, a third ring gear R3, and a third carrier C3 as rotating elements. The third gear set PG3 is also a single-pinion gear set. A plurality of pinions P3 supported by the third carrier C3 are arranged apart from each other along the circumferential direction of the third gear set PG3, and meshed with both of the third sun gear S3 and the third ring gear R3.

The fourth gear set PG4 includes a fourth sun gear S4, a fourth ring gear R4, and a fourth carrier C4 as rotating elements. The fourth gear set PG4 is also a single-pinion gear set. A plurality of pinions P4 supported by the fourth carrier C4 are arranged apart from each other along the circumferential direction of the fourth gear set PG4, and meshed with both of the fourth sun gear S4 and the fourth ring gear R4.

The first sun gear S1 and the fourth sun gear S4 remain connected with each other. The first ring gear R1 and the second sun gear S2 remain connected with each other. The second carrier C2 and the fourth carrier C4 remain connected with each other, and the third carrier C3 and the fourth ring gear R4 remain connected with each other. The input shaft 12 remains connected with the first carrier C1. The output gear 13 remains connected with the second carrier C2 and the fourth carrier C4.

The first clutch CL1 is configured to disconnect the input shaft 12 and the first carrier C1 from the third sun gear S3. The first clutch CL1 is positioned at the end of the driving source side of the transmission casing 11 and near the circumferential wall 11a of the transmission casing 11.

The second clutch CL2 is configured to disconnect the first ring gear R1 and the second sun gear S2 from the third sun gear S3. The second clutch CL2 is positioned on the outer side of the first ring gear R1 in the radial direction and near the circumferential wall 11a of the transmission casing 11.

The third clutch CL3 is configured to disconnect the second ring gear R2 from the third sun gear S3. The third clutch CL3 is positioned on the outer side of the second ring gear R2 in the radial direction and near the circumferential wall 11a of the transmission casing 11.

The first brake BR1 is configured to disconnect the first sun gear S1 and the fourth sun gear S4 from the transmission casing 11. The first brake BR1 is positioned at the end of the side opposite to the driving source side of the transmission casing 11 and near the circumferential wall 11a of the transmission casing 11.

The second brake BR2 is configured to disconnect the third ring gear R3 from the transmission casing 11. The second brake BR2 is positioned on the outer side of the third ring gear R3 in the radial direction and near the circumferential wall 11a of the transmission casing 11.

Each of these frictional coupling elements is coupled when the hydraulic oil is supplied to a coupling hydraulic chamber of the frictional coupling element. As illustrated in a coupling table in FIG. 2, by selectively coupling three out of the five frictional coupling elements, first to eighth forward gears and one reverse gear are formed. In the coupling table illustrated in FIG. 2, circles indicate the frictional coupling elements that are coupled, and blanks indicate the frictional coupling elements that are de-coupled (released).

Specifically, the first gear is formed by coupling the first clutch CL1, the first brake BR1, and the second brake BR2. The second gear is formed by coupling the second clutch CL2, the first brake BR1, and the second brake BR2. The third gear is formed by coupling first clutch CL1, the second clutch CL2, and the second brake BR2. The fourth gear is formed by coupling the second clutch CL2, the third clutch CL3, and the second brake BR2. The fifth gear is formed by coupling the first clutch CL1, the third clutch CL3, and the second brake BR2. The sixth gear is formed by coupling the first clutch CL1, the second clutch CL2, and the third clutch CL3. The seventh gear is formed by coupling the first clutch CL1, the third clutch CL3, and the first brake BR1. The eighth gear is formed by coupling the second clutch CL2, the third clutch CL3, and the first brake BR1. The reverse gear is formed by coupling the third clutch CL3, the first brake BR1, and the second brake BR2. In the sixth gear, the revolving speed of the input shaft 12 is the same as that of the output gear 13.

At the start of the vehicle, the second brake BR2 which has been released is caused to slip and then to become completely coupled, by coupling the first clutch CL1 and the first brake BR1 and thereafter supplying the hydraulic oil to a coupling hydraulic chamber of the second brake BR2. In other words, the second brake BR2 serves as a frictional coupling element for starting a vehicle.

Figure 3:
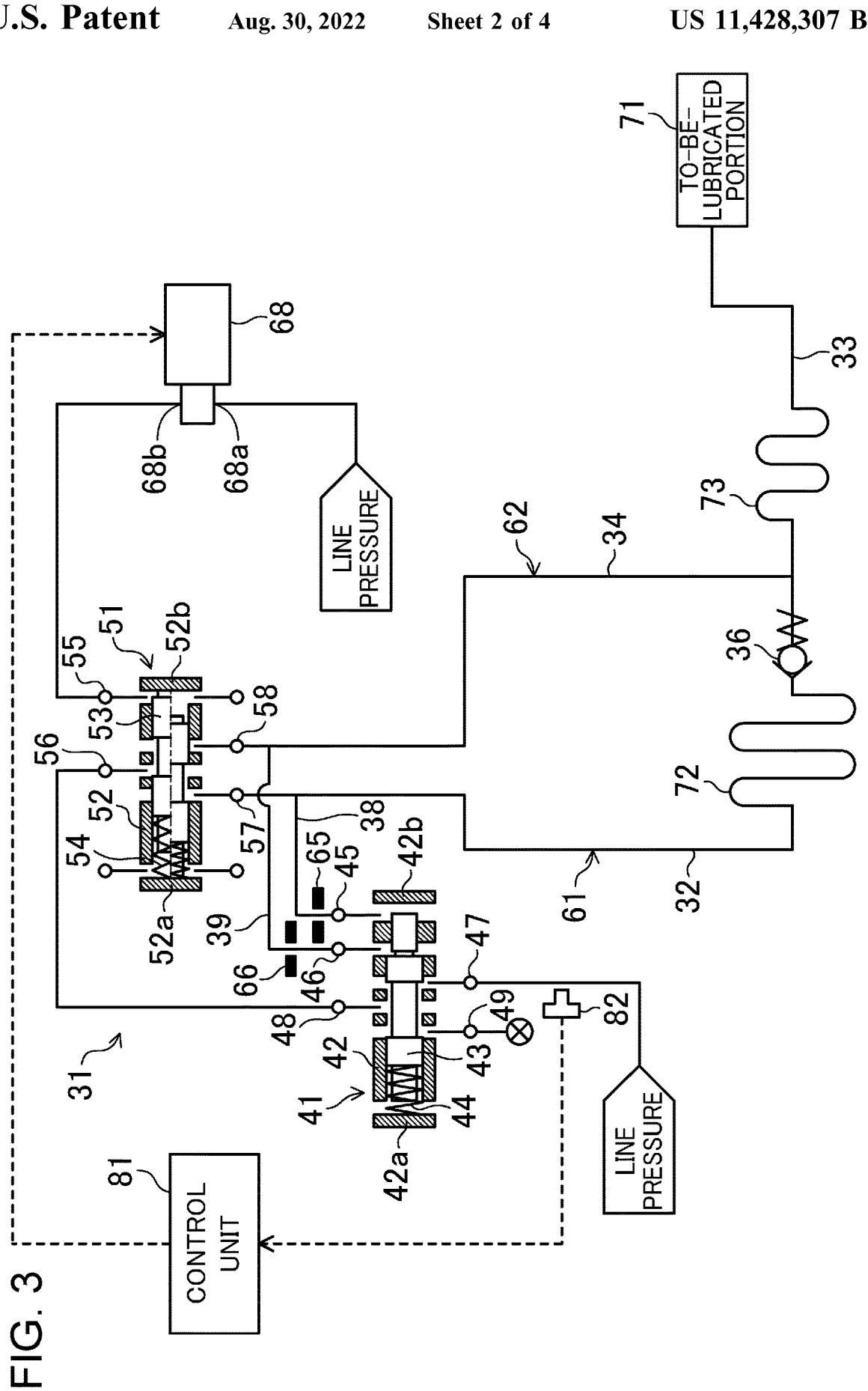
FIG. 3 is a circuit diagram illustrating a part of a lubricant oil supplying circuit included in the hydraulically actuated transmission.

FIG. 3 illustrates a part of a lubricant oil supplying circuit 31 in the transmission 1. The lubricant oil supplying circuit 31 supplies lubricant oil to a to-be-lubricated portion 71 in the transmission 1. In this embodiment, the to-be-lubricated portion 71 is, for example, a bearing or a bush, not illustrated, which supports the input shaft 12, the first to the fourth gear sets PG1 to PG4, or frictional coupling elements (particularly friction plates) other than the second brake BR2. The second brake BR2, when slipping at the start of the vehicle, requires a very large amount of lubricant oil. Thus, in the present embodiment, the lubricant oil is supplied through a lubricant oil supplying circuit (not illustrated) provided independently of the lubricant oil supplying circuit 31. The transmission 1 also includes a hydraulic oil supplying circuit for supplying hydraulic oil to each of the frictional coupling elements so as to couple and/or release the frictional coupling elements. The hydraulic oil and the lubricant oil are oil discharged from an oil pump not illustrated.

A torque converter may also be provided between the output shaft of the driving source and the input shaft 12 of the transmission 1. In such a configuration, it is not necessary to use the second brake BR2 as the frictional coupling element for starting the vehicle, and the second brake BR2 is included as the to-be-lubricated portion 71.

A reducing valve 41 is provided at the lubricant oil supplying circuit 31. The reducing valve 41 reduces the pressure of the lubricant oil having a predetermined pressure and outputs the resultant lubricant oil. In this embodiment, the predetermined pressure is a line pressure. In this example, the line pressure is a pressure of the hydraulic oil discharged from the oil pump and regulated by a regulator valve (not illustrated), and serves as the source pressure of the entire hydraulic oil and lubricant oil that are required in the transmission 1. The predetermined pressure may be any pressure equal to or lower than the line pressure, but it is preferable that the predetermined pressure be as high as possible so that a required output pressure is achieved even after the pressure is reduced.

The reducing valve 41 includes a spool 43 housed in a sleeve 42. The spool 43 is movable between a first position where the spool 43 abuts against an end wall 42a on one end of the sleeve 42 (the end wall on the left side in FIG. 3) and a second position where the spool 43 abuts against an end wall 42b on the other end of the sleeve 42 (the end wall on the right side in FIG. 3) in the axial direction of the spool 43. A first regulation port 45 is provided on the other end of the sleeve 42 where the second position is located. Part of the lubricant oil in a first path 61, which will be described later, is input to the first regulation port 45. A second regulation port 46 is also provided at a position of the sleeve 42 which is adjacent to the first regulation port 45 and on the side toward the first position with respect to the first regulation port 45.

The spool 43 is pressed toward the one end (toward the first position) in the axial direction of the spool 43 by the lubricant oil input to the first regulation port 45 or the second regulation port 46. The spool 43 is biased toward the other end (toward the second position) in the axial direction of the spool 43 by a compressed coil spring 44 provided in the sleeve 42 on the one end of the spool 43 where the first position is located.

The sleeve 42 also includes an inlet port 47 to which the lubricant oil at the predetermined pressure (line pressure) is input, an outlet port 48 from which the lubricant oil having a pressure reduced from the line pressure is output, and a drain port 49 from which surplus lubricant oil that is not output from the outlet port 48 is drained.

An output pressure at which the lubricant oil is output from the outlet port 48 is determined according to a magnitude relationship between the biasing force of the compressed coil spring 44 and the pressing force toward the spool 43 which is converted from the pressure of the lubricant oil input to the first regulation port 45 or the second regulation port 46.

In the case in which the lubricant oil is input to the first regulation port 45, the pressure of the lubricant oil input to the first regulation port 45 is equal to the output pressure of the lubricant oil output from the outlet port 48. If the output pressure is high, the pressure of the lubricant oil input to the first regulation port 45 is also high. As a result, the spool 43 is moved to the first position, which increases the amount of lubricant oil drained and decreases the output pressure. By contrast, if the output pressure is low, the pressure of the lubricant oil input to the first regulation port 45 is also low. As a result, the spool 43 is moved to the second position, which reduces the amount of lubricant oil drained and increases the output pressure. In this manner, the spool 43 stabilizes at a position determined by the magnitude relationship between the biasing force of the compressed coil spring 44 and the pressing force toward the spool 43 which is converted from the pressure of the lubricant oil input to the first regulation port 45. The output pressure is maintained at a constant value corresponding to that position.

In the case in which the lubricant oil is input to the second regulation port 46, the pressure of the lubricant oil input to the second regulation port 46 is equal to the output pressure of the lubricant oil from the outlet port 48. The output pressure is maintained at a constant value, similarly to when the lubricant oil is input to the first regulation port 45.

In the case in which the lubricant oil is input to the second regulation port 46, the spool 43 stabilizes at the same position as when the lubricant oil is input to the first regulation port 45 if the area of the spool 43 pressed toward the first position by the lubricant oil input to the second regulation port 46 is equal to the area of the spool 43 pressed toward the first position by the lubricant oil input to the first regulation port 45. This means that the output pressure at the time when the lubricant oil is input to the second regulation port 46 is equal to the output pressure at the time when the lubricant oil is input to the first regulation port 45.

However, in this embodiment, the area of the spool 43 pressed toward the first position by the lubricant oil input to the second regulation port 46 is smaller than the area of the spool 43 pressed toward the first position by the lubricant oil input to the first regulation port 45. Therefore, the pressing force applied to the spool 43 by the lubricant oil input to the second regulation port 46 is smaller than the pressing force applied to the spool 43 by the lubricant oil input to the first regulation port 45. Thus, the spool 43 stabilizes at a position closer to the second position when the lubricant oil is input to the second regulation port 46, than when the lubricant oil is input to the first regulation port 45. Therefore, the output pressure at the time when the lubricant oil is input to the second regulation port 46 is smaller than the output pressure at the time when the lubricant oil is input to the first regulation port 45.

The lubricant oil supplying circuit 31 includes a first path 61 and a second path 62. In the first path 61, the lubricant oil output from the outlet port 48 of the reducing valve 41 passes through the oil warmer 72 and the oil cooler 73, in the order listed herein, to be supplied to the to-be-lubricated portion 71. In the second path 62, the lubricant oil output from the outlet port 48 of the reducing valve 41 bypasses the oil warmer 72 and passes through the oil cooler 73 to be supplied to the to-be-lubricated portion 71. The oil warmer 72 is a heat exchanger in which heat is exchanged between the cooling water for cooling the driving source (in this embodiment, engine-cooling water) and the lubricant oil. The oil cooler 73 is a heat exchanger in which heat is exchanged between drive airflow generated by a running vehicle and the lubricant oil.

The first path 61 includes an oil warmer passage 32 provided with the oil warmer 72, and an oil cooler passage 33 connected in series with the oil warmer passage 32 and provided with the oil cooler 73. The oil cooler passage 33 is positioned downstream of the oil warmer passage 32 (toward the to-be-lubricated portion 71).

The second path 62 includes a bypass oil passage 34 that bypasses the oil warmer 72, and the oil cooler passage 33. The downstream end of the bypass oil passage 34 is connected to the downstream end of the oil warmer passage 32 (to the upstream end of the oil cooler passage 33). A check valve 36 is provided near the downstream end of the oil warmer passage 32, and prevents the lubricant oil flowing through the bypass oil passage 34 from going into the oil warmer 72.

A first connecting oil passage 38 branches off from a portion of the oil warmer passage 32 upstream of the oil warmer 72, and is connected to the first regulation port 45 of the reducing valve 41. With this configuration, part of the lubricant oil flowing through the first path 61 upstream of the oil warmer 72 and the oil cooler 73 is input to the first regulation port 45.

A second connecting oil passage 39 branches off from the bypass oil passage 34, and is connected to the second regulation port 46 of the reducing valve 41. With this configuration, part of the lubricant oil flowing through the second path 62 upstream of the oil cooler 73 is input to the second regulation port 46.

Orifices 65 and 66 are provided at the first connecting oil passage 38 and the second connecting oil passage 39, respectively. The orifices 65 and 66 are intended to prevent oil vibrations on the upstream side of the orifices 65 and 66 from being transmitted to the downstream side of the orifices 65 and 66 (to the first regulation port 45 and the second regulation port 46). The orifices 65 and 66 have a very small orifice diameter.

The lubricant oil supplying circuit 31 is provided with a switching valve 51 serving as a switching device configured to selectively switch between the first path 61 and the second path 62 as a path for supplying the lubricant oil flowing from the reducing valve 41 to the to-be-lubricated portion 71. The switching valve 51 operates in response to the operation of the ON/OFF solenoid valve 68, thereby switching the path for supplying the lubricant oil flowing from the reducing valve 41 to the to-be-lubricated portion 71.

Hydraulic oil having a preset pressure is input to the inlet port 68a of the ON/OFF solenoid valve 68. In this embodiment, the preset pressure is the line pressure. The preset pressure may be any pressure equal to or higher than the pressure at which the switching valve 51 can be operated, and equal to or lower than the withstand pressure of the ON/OFF solenoid valve 68.

When the ON/OFF solenoid valve 68 is switched ON, the hydraulic oil having the preset pressure (the line pressure) is output from the outlet port 68b, while maintaining the preset pressure. When the ON/OFF solenoid valve 68 is switched OFF, the flow of the hydraulic oil is blocked, so that no hydraulic oil is output from the outlet port 68b.

The ON/OFF solenoid valve 68 is controlled by the control unit 81. The control unit 81 is a controller using a known microcomputer as a base element, and includes: a central processing unit (CPU) that executes computer programs (including a basic control program such as an operating system (OS), and an application program started on the OS and implements a specific function); a memory which is implemented, for example, as a random access memory (RAM) or a read-only memory (ROM) and which stores the computer programs and data; and an input/output (I/O) bus for inputting and outputting electric signals.

The control unit 81 receives inputs of various types of information allowing the transmission gears of the transmission 1 to be automatically switched based on the driving conditions of the vehicle (e.g., information pertaining to a range position of a shift lever, the accelerator position, and the speed of the vehicle). The control unit 81 also receives inputs about lubricant oil temperature information from a temperature sensor 82 which detects the temperature of the lubricant oil to be supplied to the to-be-lubricated portion 71 (the lubricant oil before passing through the oil warmer 72 and the oil cooler 73). In FIG. 3, the temperature sensor 82 detects the temperature of the lubricant oil upstream of the reducing valve 41, but the temperature sensor 82 may detect the temperature of the lubricant oil downstream of the reducing valve 41 and upstream of the switching valve 51.

The control unit 81 controls the ON/OFF solenoid valve 68 based on the pieces of information received, and controls the valves provided in the hydraulic oil supplying circuit and the lubricant oil supplying circuit leading to the second brake BR2.

The control unit 81 turns the ON/OFF solenoid valve 68 to the ON state when the lubricant oil temperature detected by the temperature sensor 82 is lower than a predetermined temperature, and turns the ON/OFF solenoid valve 68 to the OFF state when the lubricant oil temperature detected by the temperature sensor 82 is equal to or higher than the predetermined temperature.

The switching valve 51 includes a spool 53 housed in a sleeve 52. The spool 53 is movable between a first position where the spool 53 abuts against an end wall 52a on one end of the sleeve 52 (the end wall on the left side in FIG. 3) and a second position where the spool 53 abuts against an end wall 52b on the other end of the sleeve 52 (the end wall on the right side in FIG. 3) in the axial direction of the spool 53. A compressed coil spring 54 biasing the spool 53 toward the second position is provided at the one end of the sleeve 52 where the first position is located.

A control port 55 connected to the outlet port 68b of the ON/OFF solenoid valve 68 is provided to the other end of the sleeve 52 where the second position is located. The ON/OFF solenoid valve 68 switches between supplying and not supplying the hydraulic oil at the preset pressure (the line pressure) to the control port 55. In other words, when the ON/OFF solenoid valve 68 is switched ON, the hydraulic oil at the line pressure is supplied to the control port 55. As a result, the spool 53 is moved to the first position against the biasing force of the compressed coil spring 54. When the ON/OFF solenoid valve is switched OFF, no hydraulic oil at the line pressure is supplied to the control port 55. As a result, the spool 53 is located at the second position due to the biasing force of the compressed coil spring 54.

The sleeve 52 is also provided with an inlet port 56 to which the lubricant oil from the reducing valve 41 is input, a first outlet port 57 connected to the first path 61 (the oil warmer passage 32), and a second outlet port 58 connected to the second path 62 (the bypass oil passage 34).

When the spool 53 is located at the first position (when the ON/OFF solenoid valve 68 is switched ON), the inlet port 56 communicates with the first outlet port 57. When the spool 53 is located at the second position (when the ON/OFF solenoid valve 68 is switched OFF), the inlet port 56 communicates with the second outlet port 58. In this manner, the switching valve 51 is capable of selectively switching between a first state in which the inlet port 56 communicates with the first outlet port 57 and a second state in which the inlet port 56 communicates with the second outlet port 58, and switches between the first state and the second state, depending on whether or not the hydraulic oil is supplied to the control port 55 by the operation of the ON/OFF solenoid valve 68.

The switching valve 51 in the first state allows the first path 61 to serve as the path for supplying the lubricant oil flowing from the reducing valve 41 to the to-be-lubricated portion 71, and the switching valve 51 in the second state allows the second path 62 to serve as the path for supplying the lubricant oil flowing from the reducing valve 41 to the to-be-lubricated portion 71.

Figure 4:
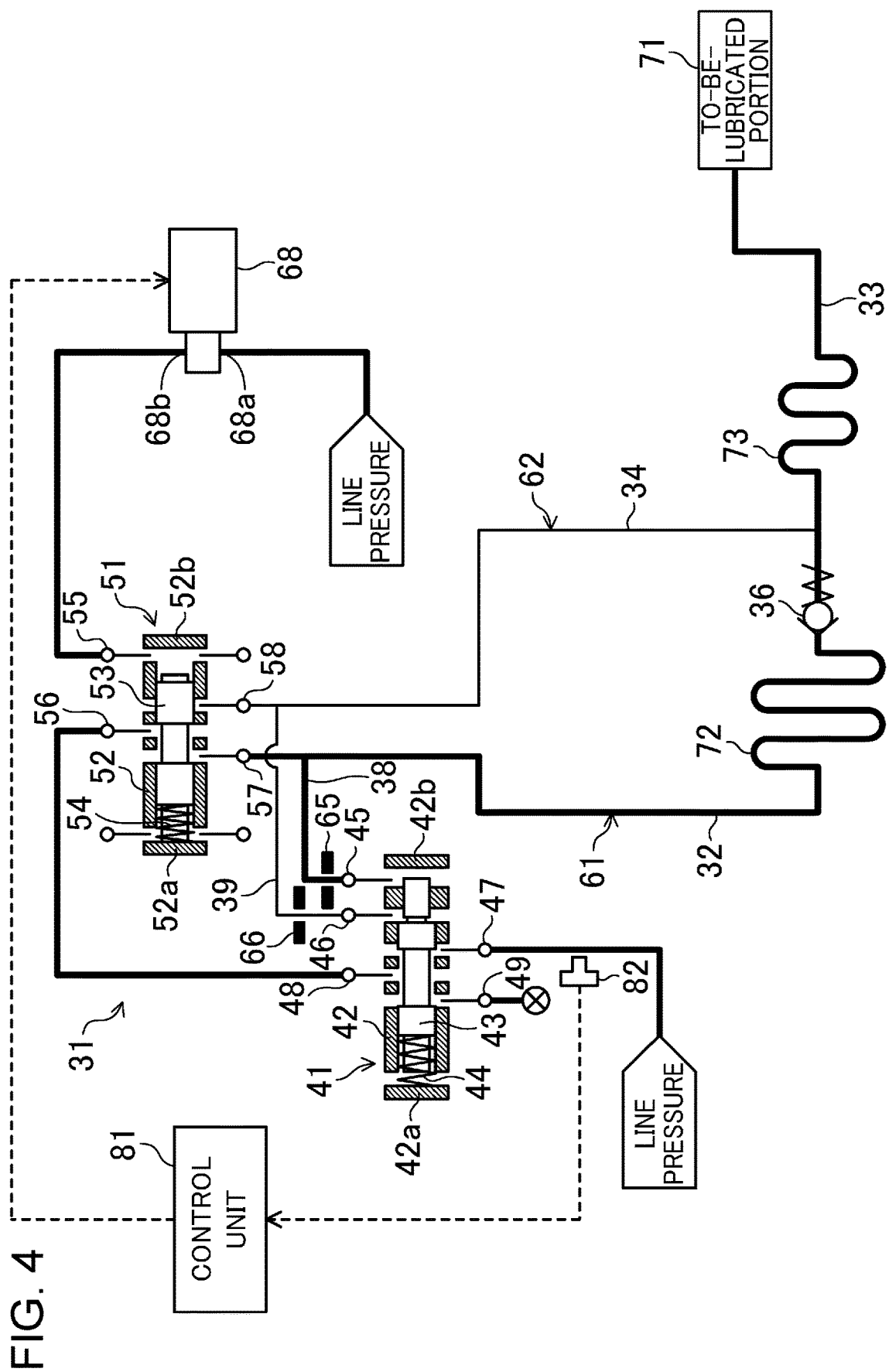
FIG. 4 is a schematic corresponding to FIG. 3, illustrating a switching valve in a first configuration (with a first path selected).
Figure 5:
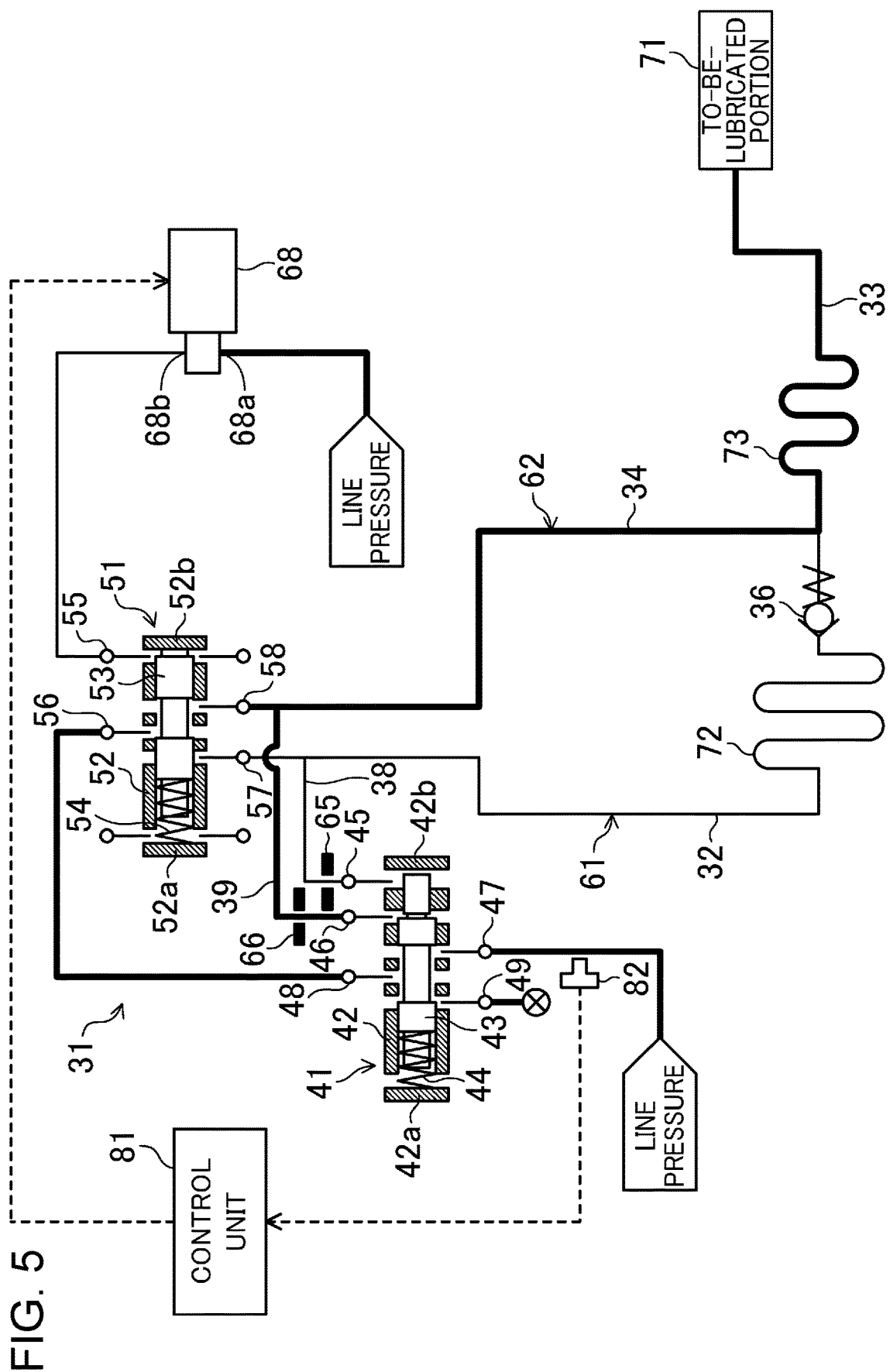
FIG. 5 is a schematic corresponding to FIG. 3, illustrating the switching valve in a second configuration (with a second path selected).

In this embodiment, the ON/OFF solenoid valve 68 is switched ON when the lubricant oil temperature detected by the temperature sensor 82 is lower than the predetermined temperature (in this embodiment, at a temperature referred to as a ultra-low temperature that is quite low among the subfreezing temperatures), so that the hydraulic oil at the line pressure is supplied to the control port 55 of the switching valve 51, as illustrated in FIG. 4. As a result, the spool 53 of the switching valve 51 moves to the first position, and the switching valve 51 turns to the first state. Thus, the lubricant oil input to the inlet port 56 of the switching valve 51 from the reducing valve 41 flows out of the first outlet port 57 of the switching valve 51 into the first path 61. This means that when the lubricant oil temperature detected by the temperature sensor 82 is lower than the predetermined temperature, the lubricant oil from the reducing valve 41 passes through the oil warmer 72 and the oil cooler 73 and is supplied to the to-be-lubricated portion 71. It is therefore possible to warm the lubricant oil by the oil warmer 72, before the lubricant oil is supplied to the to-be-lubricated portion 71, when the lubricant oil temperature is lower than the predetermined temperature. In FIGS. 4 and 5, the path through which the lubricant oil flows is indicated by thick lines.

At this time, part of the lubricant oil flowing through the oil warmer passage 32 upstream of the oil warmer 72 is input to the first regulation port 45 of the reducing valve 41 via the first connecting oil passage 38. As a result, as described above, the output pressure of the lubricant oil output from the outlet port 48 of the reducing valve 41 is maintained at a constant value (hereinafter, this constant value will be referred to as a first pressure).

By contrast, the ON/OFF solenoid valve 68 is switched OFF when the lubricant oil temperature detected by the temperature sensor 82 is equal to or higher than the predetermined temperature, so that no hydraulic oil at the line pressure is supplied to the control port 55 of the switching valve 51, as illustrated in FIG. 5. As a result, the spool 53 in of switching valve 51 moves to the second position, and the switching valve 51 turns to the second state. Thus, the lubricant oil input to the inlet port 56 of the switching valve 51 from the reducing valve 41 flows out of the second outlet port 58 of the switching valve 51 into the second path 62. This means that when the lubricant oil temperature detected by the temperature sensor 82 is equal to or higher than the predetermined temperature, the lubricant oil from the reducing valve 41 bypasses the oil warmer 72 and passes through the oil cooler 73, and is supplied to the to-be-lubricated portion 71. It is therefore possible to cool the lubricant oil by the oil cooler 73, before the lubricant oil is supplied to the to-be-lubricated portion 71, when the lubricant oil temperature is equal to or higher than the predetermined temperature.

At this time, part of the lubricant oil flowing through the bypass oil passage 34 is input to the second regulation port 46 of the reducing valve 41 via the second connecting oil passage 39. As a result, the output pressure of the lubricant oil output from the outlet port 48 of the reducing valve 41 is maintained at a constant value that is higher than the first pressure (hereinafter, this constant value will be referred to as a second pressure).

In this manner, because the second pressure is higher than the first pressure, a larger amount of the lubricant oil can be supplied to the to-be-lubricated portion 71 when the lubricant oil temperature detected by the temperature sensor 82 is equal to or higher than the predetermined temperature, than when the lubricant oil temperature is lower than the predetermined temperature. Moreover, the design of the reducing valve 41 allows the second pressure to be increased to a value close to the line pressure if the preset pressure is the line pressure, and allows a sufficient amount of the lubricant oil to be supplied to the to-be-lubricated portion 71 when the lubricant oil temperature detected by the temperature sensor 82 is equal to or higher than the predetermined temperature. On the other hand, the design of the reducing valve 41 allows a smaller amount of the lubricant oil to be supplied to the to-be-lubricated portion 71 when the lubricant oil temperature is lower than the predetermined temperature. It is therefore possible to reduce the energy loss which occurs due to stirring of the lubricant oil by a rotating member or the like at the to-be-lubricated portion 71. Hence, an appropriate amount of lubricant oil can be supplied to the to-be-lubricated portion 71 by the switching of the switching valve 51 between the first path 61 and the second path 62.

The present invention is not limited to the embodiment described above, and various substitutions are possible within the scope not deviating from the essence of the claims.

For example, in the embodiment described above, the ON/OFF solenoid valve 68 is switched ON or OFF depending on whether the lubricant oil temperature detected by the temperature sensor 82 is lower than the predetermined temperature or equal to or higher than the predetermined temperature. Alternatively, instead of depending on the lubricant oil temperature detected by the temperature sensor 82, the ON/OFF solenoid valve 68 may be switched ON or OFF depending on whether a load applied to the transmission 1 (for example, the load is substituted with a load of the driving source (which is input from a control unit that controls the driving source)) is lower than a predetermined load or equal to or higher than the predetermined load. In other words, the ON/OFF solenoid valve 68 is switched ON when the load of the transmission 1 is lower than the predetermined load, and switched OFF when the load of the transmission 1 is equal to or higher than the predetermined load.

The embodiment described above is merely illustrative, and is not intended to limit the interpretation of the scope of the present invention in any way. The scope of the present invention is defined by the appended claims, any modifications or changes falling within the scope of equivalency of the claims are therefore intended to be embraced therein.

INDUSTRIAL APPLICABILITY

The present invention is useful for a hydraulically actuated transmission including a lubricant oil supplying circuit for supplying a lubricant oil to a to-be-lubricated portion of the hydraulically actuated transmission, and is useful in switching between a first path passing through an oil warmer and an oil cooler and a second path bypassing the oil warmer and passing through the oil cooler, as a path for supplying the lubricant oil to the to-be-lubricated portion.

DESCRIPTION OF REFERENCE CHARACTERS

1 Hydraulically Actuated Transmission
31 Lubricant Oil Supplying Circuit
32 Oil Warmer Passage
33 Oil Cooler Passage
34 Bypass Oil Passage
41 Reducing Valve
43 Spool
44 Compressed Coil Spring
45 First Regulation Port
46 Second Regulation Port
51 Switching Valve (Switching Device)
55 Control Port
56 Inlet Port
57 First Outlet Port
58 Second Outlet Port
68 On/Off Solenoid Valve
71 To-Be-Lubricated Portion
72 Oil Warmer
73 Oil Cooler

The invention claimed is:

1. A hydraulically actuated transmission installed in a vehicle, the hydraulically actuated transmission comprising:
a lubricant oil supplying circuit configured to supply a lubricant oil to a to-be-lubricated portion in the hydraulically actuated transmission; and
a reducing valve provided at the lubricant oil supplying circuit and configured to reduce a pressure of the lubricant oil having a predetermined pressure and output the lubricant oil with a reduced pressure, wherein
the lubricant oil supplying circuit includes a first path for supplying the lubricant oil from the reducing valve to the to-be-lubricated portion via an oil warmer and an oil cooler, and a second path for supplying the lubricant oil from the reducing valve to the to-be-lubricated portion via the oil cooler while bypassing the oil warmer,
the hydraulically actuated transmission further comprises a switching device configured to selectively switch between the first path and the second path as the path for supplying the lubricant oil from the reducing valve to the to-be-lubricated portion, and
the reducing valve is configured such that an output pressure of the lubricant oil output from the reducing valve is higher when the second path is selected by the switching device, than when the first path is selected by the switching device.

2. The hydraulically actuated transmission of claim 1, wherein
the reducing valve includes:
a first regulation port to which part of the lubricant oil flowing through the first path upstream of the oil warmer and the oil cooler is input;
a second regulation port to which part of the lubricant oil flowing through the second path upstream of the oil cooler is input;
a spool pressed toward one end in an axial direction of the spool by the lubricant oil input to the first regulation port or the second regulation port; and
a spring pressing the spool toward the other end in the axial direction of the spool, wherein
the reducing valve is configured such that a pressing force applied to the spool toward the one end of the spool by the lubricant oil input to the second regulation port is smaller than a pressing force applied to the spool toward the one end of the spool by the lubricant oil input to the first regulation port, and therefore such that the output pressure of the lubricant oil from the reducing valve is higher when the second path is selected by the switching device, than when the first path is selected by the switching device.

3. The hydraulically actuated transmission of claim 2, wherein
the switching device is configured as a switching valve, the switching valve includes:
an inlet port to which the lubricant oil from the reducing valve is input;
a first outlet port connected to the first path; and
a second outlet port connected to the second path,
the switching valve is capable of selectively switching between a first state and a second state,
in the first state, the inlet port communicates with the first outlet port, and the first path is used as the path for supplying the lubricant oil from the reducing valve to the to-be-lubricated portion, and
in the second state, the inlet port communicates with the second outlet port, and the second path is used as the path for supplying the lubricant oil from the reducing valve to the to-be-lubricated portion.

4. The hydraulically actuated transmission of claim 3, further comprising:
a solenoid valve configured to switch between supplying and not supplying a hydraulic oil having a preset pressure to a control port provided at the switching valve, wherein
the switching valve is configured to switch between the first state and the second state depending on the supplying or not supplying the hydraulic oil to the control port by the solenoid valve.

5. The hydraulically actuated transmission of claim 1, wherein
the switching device is configured as a switching valve, the switching valve includes:
an inlet port to which the lubricant oil from the reducing valve is input;
a first outlet port connected to the first path; and
a second outlet port connected to the second path,
the switching valve is capable of selectively switching between a first state and a second state,
in the first state, the inlet port communicates with the first outlet port, and the first path is used as the path for supplying the lubricant oil from the reducing valve to the to-be-lubricated portion, and
in the second state, the inlet port communicates with the second outlet port, and the second path is used as the path for supplying the lubricant oil from the reducing valve to the to-be-lubricated portion.

6. The hydraulically actuated transmission of claim 5, further comprising:
a solenoid valve configured to switch between supplying and not supplying a hydraulic oil having a preset pressure to a control port provided at the switching valve, wherein the switching valve is configured to switch between the first state and the second state depending on the supplying or not supplying the hydraulic oil to the control port by the solenoid valve.

* * * * *